United States Patent [19]

Konishi

[11] Patent Number: 4,524,381

[45] Date of Patent: Jun. 18, 1985

[54] IMAGE REPRODUCING APPARATUS

[75] Inventor: Masahiro Konishi, Saitama, Japan

[73] Assignee: Fuji Photo Film Co., Ltd., Japan

[21] Appl. No.: 376,642

[22] Filed: May 10, 1982

[30] Foreign Application Priority Data

May 12, 1981 [JP] Japan .................................. 56-71145

[51] Int. Cl.³ ............................................ H04N 9/535
[52] U.S. Cl. ..................... 358/29; 358/315; 358/335; 358/906
[58] Field of Search ................. 358/906, 29, 310, 163, 358/41, 28, 10, 80, 209, 227, 228, 335, 327, 142, 213, 315, 316

[56] References Cited

U.S. PATENT DOCUMENTS

| 3,833,758 | 9/1974 | Ferrari ................................. 358/335 |
| 4,130,734 | 12/1978 | Mender et al. ................... 358/906 X |
| 4,131,919 | 12/1978 | Lloyd et al. ...................... 358/906 X |
| 4,214,258 | 7/1980 | van der Valk ................... 358/906 X |
| 4,232,329 | 11/1980 | Horak et al. ..................... 358/906 X |
| 4,237,488 | 12/1980 | Takemura .......................... 358/163 |
| 4,262,301 | 4/1981 | Erlichman ....................... 358/906 X |
| 4,395,730 | 7/1983 | Shen ..................................... 358/29 |
| 4,399,464 | 8/1983 | Hix et al. ............................ 358/213 |
| 4,415,937 | 11/1983 | Nishizawa et al. ............. 358/213 X |
| 4,420,773 | 12/1983 | Toyoda et al. .................. 358/213 X |

Primary Examiner—John C. Martin
Assistant Examiner—Victor R. Kostak
Attorney, Agent, or Firm—Saidman, Sterne, Kessler & Goldstein

[57] ABSTRACT

An image reproducing apparatus for reproducing the image data photographed and recorded on a recording medium by use of an electronic camera, comprising a processing mechanism for processing the image data based on image reproduction signal processing data recorded on the same recording medium on which the image data is recorded by use of the same electronic camera. The image reproduction signal processing data include compensation data for compensating for color temperature, address of defective picture element or the like, instruction data for instructing whether to reproduce the image data recorded on the recording medium or not, or the like.

22 Claims, 7 Drawing Figures

IMAGE REPRODUCING APPARATUS

BACKGROUND OF THE INVENTION

1. Field of the Invention

This invention relates to an image reproducing apparatus for reproducing the image data recorded on a recording medium by use of an electronic camera.

2. Description of the Prior Art

In the reproduction (for example, printing) of the image information recorded by use of conventional cameras using silver salt photographic materials, it is a general practice to compensate for the color temperature or the like so as to achieve image reproduction as precisely as possible. However, because the compensation must be conducted using a compensation value presumed from the image information recorded on the recording medium, it is difficult to precisely reproduce the image information and, in spite of steady improvements being made in compensation theory, it often happens that the presumed value is completely wrong. To eliminate the disadvantage of the conventional system and obtain a precisely reproduced image, it would be effective to record the data necessary for image reproduction processing on the same recording medium on which the object image information is recorded and to reproduce the image information compensated on the basis of the recorded compensation data. However, it is impossible with the conventional cameras using silver salt photographic materials to record the data necessary for image reproduction processing on the same recording medium on which the image information is recorded.

More recently, an attempt has been made to develop an electronic camera using an image pickup device such as a charge coupled device (CCD), pickup tube or the like. In the electronic camera, the light information is once converted to an electric signal by the image pickup device, and the obtained electric signal is then recorded on a recording medium such as magnetic tape. Accordingly, with the electronic camera, it is possible to easily record various other data on the same recording medium on which the object image information is recorded, by converting the data to electric signals. Further, even if all of the various kinds of non-image data, for example photographing data such as date of photographing, shutter speed, aperture value, frame number, place of photographing, name of photographer and object, and various kinds of memo data or the like, are input to the system, the quantity of the electric signals converted from them and encoded is very small compared with that of the electric signals converted from the object image information. For example, all of the above-mentioned non-image data can be recorded with a signal quantity equivalent to between several picture elements and several tens of picture elements of the digitized object image information. This level of signal quantity is obviously very small compared with the signal quantity of the object image information which generally corresponds to between tens of thousands of picture elements and hundreds of thousands of picture elements. Accordingly, if the data for compensation in image reproduction, for example data on color temperature, address of defective picture element occurring when the image pickup device is manufactured or the like are used as the above-mentioned non-image data, it is possible to precisely carry out compensation on the basis of the compensation data during image reproduction in the image reproducing apparatus.

SUMMARY OF THE INVENTION

The primary object of the present invention is to provide an image reproducing apparatus capable of satisfactorily reproducing the image data recorded on a recording medium by use of an electronic camera.

Another object of the present invention is to provide an image reproducing apparatus capable of satisfactorily reproducing the image data recorded by use of a small, light, low-power-consumption electronic camera.

The specific object of the present invention is to provide an image reproducing apparatus which can display and/or record the image data by processing the image signal on the basis of the data for processing the image reproduction signal recorded on the same recording medium on which the image data is recorded by use of an electronic camera.

The above objects of the present invention can be accomplished by an image reproducing apparatus for reproducing the image data photographed and recorded on a recording medium by use of an electronic camera, comprising a processing means for processing the image data on the basis of image reproduction signal processing data recorded on the same recording medium on which the image data is recorded by use of the same electronic camera.

The image reproduction signal processing data referred to here generally encompasses both data for the compensation of image reproduction such as color temperature, address of defective picture element for indicating the position of any defective picture element occurring when the image pickup device is manufactured, and information on the arrangement of the color filter array on the surface of the image pickup device, and such other data as instruction signals for maintaining secrecy or preventing a defective record section from being reproduced, and identification codes for discriminating between continuous shooting and single frame shooting modes. In accordance with the present invention, these data are recorded on the same recording medium on which the object image information is recorded, and in the same camera that is used to record the image information.

DESCRIPTION OF THE PREFERRED EMBODIMENTS

The present invention will hereinbelow be described in further detail with reference to the accompanying drawings.

First, the electronic camera used to record the image data and the image reproduction signal processing data on a recording medium for the purpose of the present invention is described below.

Figure 1:
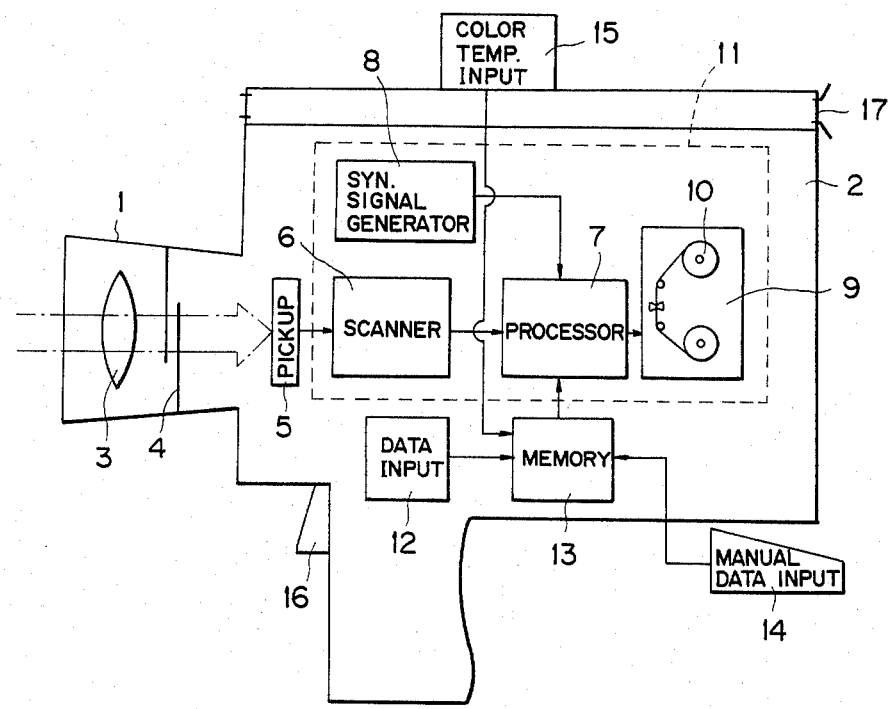
FIG. 1 is a schematic sectional view showing the electronic camera used for the image reproducing apparatus in accordance with the present invention.

In FIG. 1, the electronic camera used for the purpose of the present invention is used to take still image or motion image photographs and has a camera body 2 provided with a lens mount 1 like a conventional camera using silver salt photographic materials. In the lens mount 1 are located a photographic lens 3 and shutter 4, which have configurations similar to those of the conventional camera. An image pickup device 5 is located at the position of image formation of the photographic lens 3, namely the position of the film surface in the conventional camera. The image pickup device 5 may be a solid state image pickup device constituted by a charge coupled device (CCD) or the like or may be a pickup tube such as vidicon. In the embodiment shown in FIG. 1, a solid state image pickup device constituted by a CCD is used as the image pickup device 5. The CCD comprises a plurality of rectangularly-arranged photoelectric conversion picture elements having the function of photoelectric conversion for constituting respective picture elements. An image is formed on the image pickup device 5 by the photographic lens 3 and, in the case of photographing a still image, the time of exposure of the image pickup device 5 to the image information light is adjusted by the shutter 4.

When the image is formed on the image pickup device 5, each photoelectric conversion picture element constituting the image pickup device 5 generates an electric signal according to the light intensity received thereby, and temporarily stores the electric signal. The electric signals stored in the photoelectric conversion cells are then sequentially output from a scanner 6 to a signal processor 7. The signal processor 7 has an amplifier, a quantizer or the like, and performs such processing operations as amplification, encoding or the like of the electric signals fed from the scanner 6. The electric signals thus processed are then forwarded to a recorder 9 which records them as image data on a recording medium 10 releasably fitted therein, this recording operation being conducted in accordance with a synchronizing signal generated by a synchronizing signal generator 8. The recording medium 10 may be a magnetic tape as shown or may be a magnetic disk, magnetic drum or the like. The scanner 6, the signal processor 7, the synchronizing signal generator 8 and the recorder 9 together constitute a recording controller 11. The recording controller 11 may be of the type described for example in U.S. Pat. No. 4,131,919 when still image photographs are to be taken, and in U.S. Pat. No. 3,962,725 for the purpose of motion image photographs.

Among the above-mentioned non-image data, those data which are automatically recorded at the time of taking a photograph, such as date of photographing, aperture value, shutter speed, frame number or the like, are encoded and output to a data memory 13 by a data input unit 12. A manual data input unit 14 is also installed to permit manually setting and encoding of data, which cannot automatically be recorded at the time of taking a picture, before or after taking a picture and to output the encoded data to the data memory 13. Examples of data of this type are the place of photographing, name of photographer, object, identification number to be attached to the corresponding record section for maintaining secrecy, data for indicating that the record is defective, and simple information such as characters or numerals.

Figure 2:
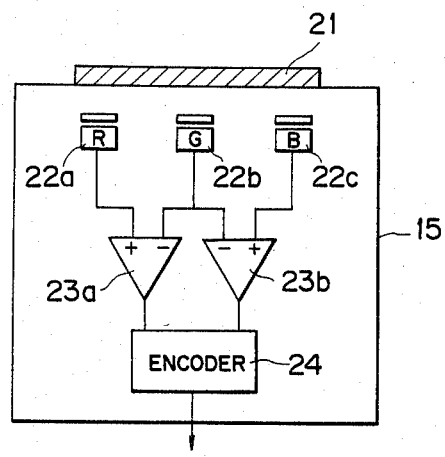
FIGS. 2 and 3 are enlarged views showing the input unit for color temperature compensation information used in the electronic camera shown in FIG. 1.
Figure 3:
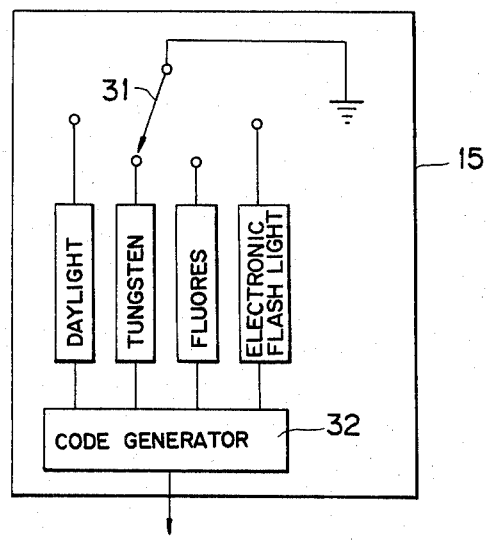

Further, a color temperature information input unit 15 is used to input the color temperature information to the recording medium 10 for the purpose of compensating for the color temperature when the image information recorded on the recording medium 10 is reproduced in the image reproducing apparatus in accordance with the present invention. The data on the color temperature is encoded by the color temperature information input unit 15 and sent to the data memory 13. The color temperature information input unit 15 may for example be of the type shown in FIG. 2 in which the illuminating light transmitted through a light diffusing plate 21 located at the top of the unit 15 is measured by sensors 22a, 22b and 22c respectively having their sensitivities at R (red), G (green) and B (blue) regions. The output signals obtained in accordance with the intensities of respective incident light regions are then converted to differential signals of R minus G, and B minus G by differential amplifiers 23a and 23b. Thereafter, the differential signals thus obtained are encoded by an encoder 24 and sent to the aforesaid data memory 13. With the color temperature information input unit 15 shown in FIG. 2, it is possible for the camera itself to automatically measure and record the color temperature. Alternatively, the color temperature information input unit 15 may be of the type shown in FIG. 3 in which the photographer discriminates the kind of the illuminating light from among daylight, tungsten light, fluorescent light and strobe. In this case, a switch 31 is manually connected with a contact corresponding to the illuminating light, and the data encoded according to the illuminating light used is output from a code generator 32 to the aforesaid data memory 13.

The address of defective picture elements of the image pickup device 5, information on the arrangement of color filter array provided on the surface of the image pickup device 5, or the like, are predetermined when the image pickup device 5 is manufactured. The data of this type may for example be output as data for compensation in image reproduction when the data is recorded on the recording medium by use of an ROM (read only memory) encoding and storing these data in the data memory 13. The above-mentioned code for discriminating between continuous shooting and single frame shooting modes of the photographed image may be recorded by using members for indicating these modes in the camera body, or may be automatically recorded by detecting the shutter operations.

The camera body 2 is also provided with a shutter button 16, view finder 17, or the like as in the case of the conventional camera.

Figure 4:
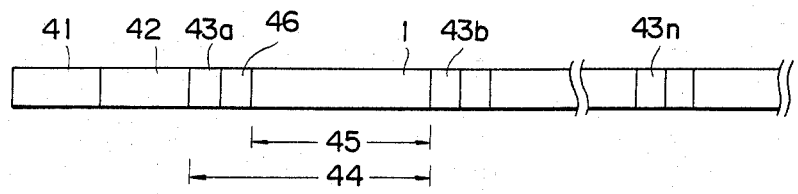
FIG. 4 is a schematic view showing the data structure of the recording medium used in the electronic camera shown in FIG. 1.

FIG. 4 shows an example of the data structure on the recording medium 10 on which various data have been recorded as described above. At the beginning of the recording medium 10 are recorded an identification number 41, address 42 of the defective picture element(s), information on the arrangement of the color filter array, or the like. The remaining portion of the recording medium 10 is divided to frames by synchronizing signals 43a, 43b, . . . , 43n. Each frame 44 comprises image data 45 and coded non-image data 46. It is of course possible to record the identification number 41, address 42 of defective picture element(s), information on the arrangement of the color filter array, or the like, within the region of the coded non-image data 46 in one frame 44 or, in so far as the coded data 46 can be separated later from other data, the coded data 46 may be recorded in another frame. In the data structure shown in FIG. 4, the image data 45 and the coded data 46 are recorded in different portions of each frame 44. However, in so far as both data 45 and 46 are recorded separably from each other, they may also be recorded in the same portion of each frame 44.

Figure 5:
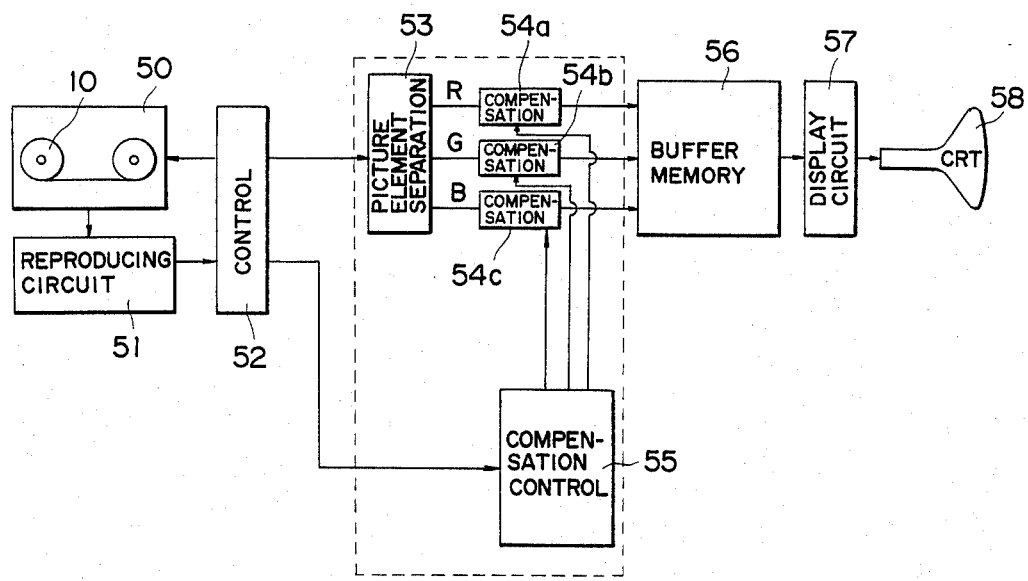
FIG. 5 is a schematic view showing an embodiment of the image reproducing apparatus provided with a means for compensating for color temperature in accordance with the present invention.

FIG. 5 schematically shows an embodiment of the image reproducing apparatus in accordance with the present invention for carrying out the color temperature compensation of a reproduced image on the basis of the color temperature compensation signal recorded on the recording medium.

In FIG. 5, the image reproducing apparatus comprises the recording medium 10 on which various data other than the image data are recorded together with the image information by use of the electronic camera having electronic memo, a drive unit 50 and a reproducing circuit 51 for reproducing the recording medium 10, a reproduction control 52 for controlling said drive unit 50 and separating the output signal sent from said reproducing circuit 51 into image data and non-image data, a color picture element separating circuit 53 for separating the image data output from said reproduction control 52 into the R, G and B primary color signals, color temperature compensating circuits 54a, 54b and 54c for compensating the R, G and B primary color signals on the basis of the color temperature data in said non-image data received from said reproduction control 52, a color temperature compensation control circuit 55 for controlling said color temperature compensating circuits 54a, 54b and 54c, a buffer memory 56 for temporarily storing the R, G and B primary color signals compensated for color temperature, a display circuit 57 and a CRT 58 for displaying the signals stored in said buffer memory 56.

In the image reproducing apparatus shown in FIG. 5, the image information is reproduced from the recording medium as described below.

The drive unit 50 is actuated to move the recording medium 10 by an instruction given from the reproduction control 52, and, for example, the identification number recorded at the beginning of the recording medium 10 is read by the reproducing circuit 51. Then, the drive unit 50 stops temporarily.

When the instruction is issued to start reproduction, the reading of the information recorded on the recording medium 10 is continued and the information contained in the first frame is read out. In this case, the reproduction control 52 determines whether to reproduce the image data contained in each frame by further reading the corresponding instruction signal. A frame not to be reproduced is skipped so as to start reading the information in the next frame. As for the frame to be reproduced, the color temperature and the image data contained therein are read out. Then, the image data is separated from the color temperature data by the reproduction control 52 and sent to the color picture element separating circuit 53, where the image data is separated into the R, G and B primary color signals, which are in turn sent to respective color temperature compensating circuits 54a, 54b and 54c. Meanwhile, the color temperature data separated from the image data by the reproduction control 52 is sent to the color temperature compensation control circuit 55 to calculate the compensation values. The compensation values are used to control the color temperature compensating circuits 54a, 54b and 54c to obtain well-balanced R, G and B primary color signals. The R, G and B signals compensated for color temperature are then temporarily stored in the buffer memory 56 and used to display the image on the CRT 58 via the display circuit 57. In this way, color balance compensation is conducted on the basis of the color temperature information recorded on the recording medium when a photograph is taken, and the image reproduction is carried out for each frame. When the above-mentioned CRT 58 is replaced by a photographic printer, it is possible to obtain a print precisely compensated for the color balance on the basis of the color temperature information recorded on the recording medium at the time of photographing.

Figure 6:
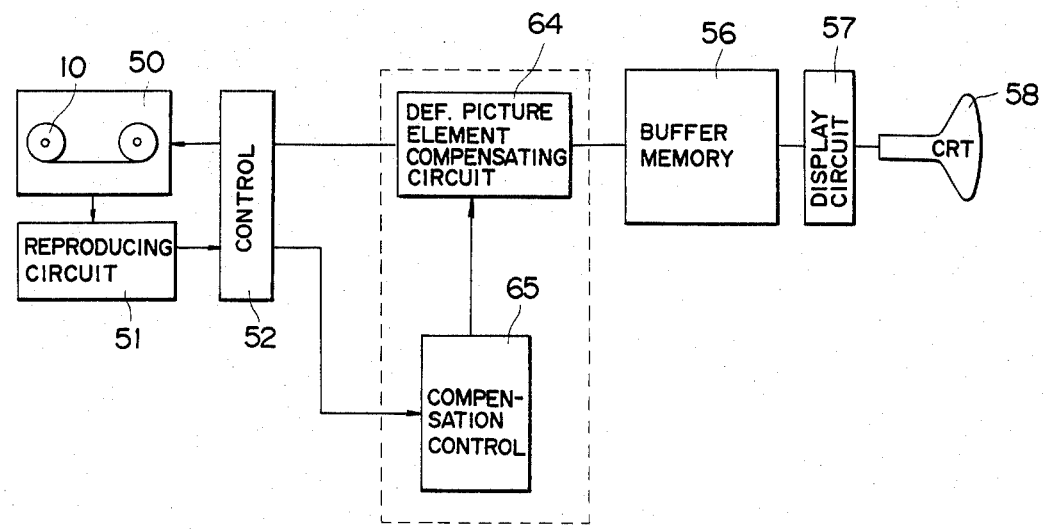
FIG. 6 is a schematic view showing another embodiment of the image reproducing apparatus provided with a means for compensating for defective picture elements in accordance with the present invention.

FIG. 6 schematically shows another embodiment of the image reproducing apparatus, which is provided with a means for compensating for defective picture elements in accordance with the present invention. In FIG. 6, similar components are numbered with the same reference numerals as those in FIG. 5. The embodiment shown in FIG. 6 is provided with a defective picture element compensating circuit 64 and a defective picture element compensation control circuit 65 for controlling the circuit 64, instead of the color temperature compensating mechanism including the color picture element separating circuit 53, color temperature compensating circuits 54a, 54b, 54c, and color temperature compensation control circuit 55 surrounded by the dotted line in FIG. 5.

Figure 7:
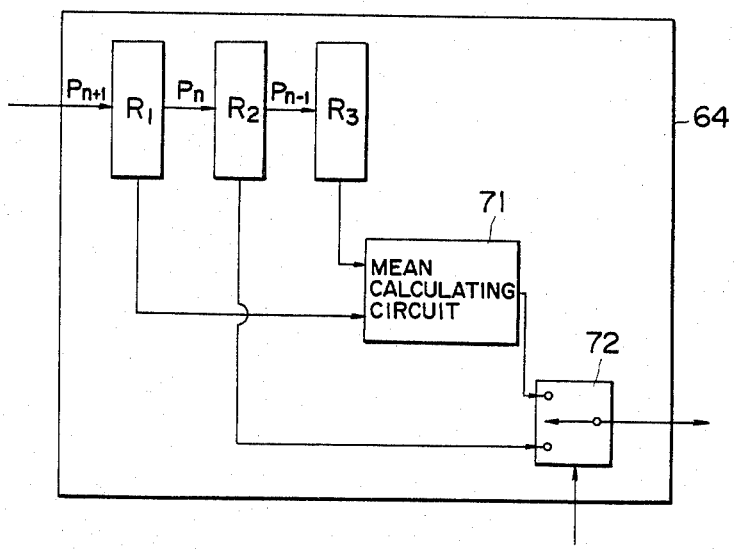
FIG. 7 is a schematic view showing the defective picture element compensating circuit used in the embodiment shown in FIG. 6.

In the image reproducing apparatus shown in FIG. 6, the signal recorded on the recording medium 10 is input to the defective picture element compensating circuit 64 via the reproduction control 52. As shown in FIG. 7, the defective picture element compensating circuit 64 has three registers R1, R2 and R3, a mean value calculating circuit 71, and a switch 72. The switch 72 is changed over by an instruction signal sent from the defective picture element compensation control circuit 65 in such a manner that, if the image data Pn of the n'th picture element stored in the register R2 is normal (i.e. not defective), the output of the register R2 is sent to the buffer memory 56. If the image data Pn of the n'th picture element stored in the register R2 is defective, compensation for the defective element is conducted in response to the instruction signal sent from the defective picture element compensation control circuit 65 according to the known signal interpolation technique. For example, the mean value calculating circuit 71 calculates the mean value of the image data Pn−1 of the n−1'th picture element stored in the register R1 and the image data Pn+1 of the n+1'th picture element stored in the register R3, and the switch 72 is changed over to output the calculated mean value as the image data of the n'th picture element to the buffer memory 56.

In this way, defective picture elements are compensated for, and the image data stored in the buffer memory 56 is displayed on the CRT 58. The image reproduction as described above is conducted for each frame.

Further, the image reproducing apparatus in accordance with the present invention may also be provided with a mechanism for detecting the code recorded on the recording medium by the electronic camera to indicate the continuous shooting mode and the single frame shooting mode and, if the photographing mode is the continuous shooting mode, sequentially reproducing the related image frames for example at a certain interval. In this case, it is possible to reproduce a motion image of the object.

The image reproducing apparatus in accordance with the present invention may be provided with both color temperature compensating means and defective picture element compensating means. Further, the apparatus may have a mechanism for printing the image data on a photosensitive material, instead of displaying it on a CRT. In case the electronic camera having electronic memo can record such photographing data as date of photographing, name of photographer and object, the image reproducing apparatus in accordance with the present invention may be provided with a function to indicate the photographing data on the reproduced image as desired or to indicate it on another displaying means independent from the reproduced image.

The present invention is characterized in that the necessary signal processing is effected by the image reproducing apparatus on the basis of the image reproduction processing data, which has been encoded and recorded by the electronic camera, when the electric signal of the photographed image is to be processed for compensation or the like. Accordingly, with the apparatus of the present invention, all that is required for reproduction is that the data necessary for signal processing in the image reproducing apparatus be encoded and recorded by the electronic camera. This feature of the present invention can satisfy the need for a smaller, lower-power-consumption electronic camera. This need cannot be satisfied if the system for processing the signals of the photographed image is included in an electronic camera.

As described above, with the image reproducing apparatus in accordance with the present invention for reproducing the information recorded on a recording medium by use of an electronic camera having electronic memo, it is possible for example to precisely compensate for color, and to compensate for defects in the reproduced image due to defects in the image pickup device. Thus it is possible to satisfactorily reproduce the image data photographed. Further, it is necessary only that the electronic camera have a simple mechanism for encoding and recording the data necessary for the processsing in the image reproducing apparatus. Accordingly, it is possible to reduce the size, weight and power consumption of the electronic camera.

I claim:

1. An image reproducing apparatus adapted for use with an electronic camera which produces image data and image reproduction signal processing data functionally related to such image data, which apparatus comprises:
   (a) first means for storing the image data and its functionally related image reproduction signal processing data on the same recording medium, and for providing at an output the image data and its functionally related image reproduction signal processing data by retrieving the same from said recording medium; and
   (b) processing means, connected to said output of said first means, for processing the image data as a function of its functionally related image reproduction signal processing data, wherein the image reproduction signal processing data comprises compensation data for compensating for deficiencies in reproduction of an image photographed by the electronic camera.

2. The apparatus as defined in claim 1, wherein said processing means comprises compensating means for compensating the image data so as to reproduce substantially precisely the image data on the basis of said compensation data.

3. An image reproducing apparatus adapted for use with an electronic camera which produces image data and image reproduction signal processing data functionally relates to such image data, which apparatus comprises:
   (a) first means for storing the image data and its functionally related image reproduction signal processing data on the same recording medium, and for providing at an output the image data and its functionally related image reproduction signal processing data by retrieving the same from said recording medium; and
   (b) processing means, connected to said output of said first means, for processing the image data as a function of its functionally related image reproduction signal processing data, wherein the image reproduction signal processing data comprises color temperature data.

4. The apparatus as defined in claim 3, wherein said processing means comprises color temperatuare compensating means for compensating the image data so as to reproduce substantially precisely the image data on the basis of said color temperature data.

5. An image reproducing apparatus adapted for use with an electronic camera which produces image data and image reproduction signal processing data functionally related to such image data, which apparatus comprises:
   (a) first means for storing the image data and its functionally related image reproduction signal processing data on the same recording medium, and for providing at an output the image data and its functionally related image reproduction signal processing data by retrieving the same from said recording medium; and
   (b) processing means, connected to said output of said first means, for processing the image data as a function of its functionally related image reproduction signal processing data, wherein the image reproduction signal processing data comprises address data of a defective picture element of a pickup of the electronic camera.

6. The apparatus as defined in claim 5, wherein said processing means comprises defective picture element compensating means for compensating the image data so as to reproduce substantially precisely the image data on the basis of said address data.

7. An image reproducing apparatus adapted for use with an electronic camera which produces image data and image reproduction signal processing data functionally related to such image data, which apparatus comprises:
   (a) first means for storing the image data and its functionally related image reproduction signal processing data on the same recording medium, and for providing at an output the image data and its functionally related image reproduction signal processing data by retrieving the same from said recording medium; and
   (b) processing means, connected to said output of said first means, for processing the image data as a function of its functionally related image reproduction signal processing data, wherein the image reproduction signal processing data comprises instruction data for instructing whether to reproduce the image data stored by said first means.

8. The apparatus as defined in claim 7, wherein said processing means comprises selecting means for selecting an image to be reproduced in accordance with said instruction data.

9. An image reproducing apparatus adapted for use with an electronic camera which produces image data and image reproduction signal processing data functionally related to such image data, which apparatus comprises:
(a) first means for storing the image data and its functionally related image reproduction signal processing data on the same recording medium, and for providing at an output the image data and is functionally related image reproduction signal processing data by retrieving the same from said recording medium; and
(b) processing means, connected to said output of said first means, for processing the image data as a function of its functionally related image reproduction signal processing data, wherein the image reproduction signal processing data comprises compensating data to compensate for fixed factors pertaining to the electronic camera.

10. The apparatus as defined in claim 9, wherein said processing means comprises compensating means for compensating the image data so as to reproduce substantially precisely the image data on the basis of said compensating data.

11. The apparatus as defined in claim 9, wherein said compensating data comprises address data for an address of a defective picture element of a pickup of the electronic camera.

12. The apparatus as defined in claim 9, wherein said compensating data comprises color filter data indicative of the arrangement of a color filter array.

13. The apparatus as defined in claim 11 or 12, wherein said processing means comprises compensating means for compensating the image data so as to reproduce substantially precisely the image data on the basis of said compensating data.

14. An image reproducing apparatus adapted for use with an electronic camera which produces image data and image reproduction signal processing data functionally related to such image data, which apparatus comprises:
(a) first means for storing the image data and its functionally related image reproduction signal processing data on the same recording medium, and for providing at an output the image data and its functionally related image reproduction signal processing data by retrieving the same from said recording medium; and
(b) processing means, connected to said output of said first means, for processing the image data as a function of its functionally related image reproduction signal processing data, wherein the image reproduction signal processing data comprises compensating data to compensate for changeable information pertaining to an image photographed by the electronic camera.

15. The apparatus as defined in claim 14, wherein said compensating data comprises color temperature data.

16. The apparatus as defined in claim 14, wherein said compensating data comprises instruction data for maintaining secret a portion of the image data.

17. The apparatus as defined in claim 14, wherein said compensating data comprises defective record section data indicative of a defective portion of said recording medium.

18. The apparatus as defined in claim 14, wherein said compensating data comprises identification code data indicative of a continuous shooting mode or a single frame shooting mode of the electronic camera.

19. The apparatus as defined in claim 14, 15, 16, 17 or 18, wherein said processing means comprises compensating means for compensating the image data so as to reproduce substantially precisely the image data on the basis of said compensating data.

20. An image reproducing apparatus adapted for use with an electronic camera which produces image data and image reproduction signal processing data functionally related to such image data, which apparatus comprises:
(a) first means for storing the image data and its functionally related image reproduction signal processing data on the same recording medium, and for providing at an output the image data and its functionally related image reproduction signal processing data by retrieving the same from said recording medium; and
(b) processing means, connected to said output of said first means, for processing the image data as a function of its functionally related image reproducton signal processing data, wherein said processing means comprises means for displaying instruction data, wherein the image reproduction signal processing data comprises instruction data pertaining to an image photographed by the electronic camera.

21. A system comprising:
(a) electronic camera means for providing image data based on a photographed image and image reproduction signal processing data functionally related to said image data;
(b) storage means, adapted to be connected to said electronic camera means, for storing said image data and said functionally related image reproduction signal processing data, and for providing the same at an output by retrieving said stored image data and functionally related image reproduction signal processing;
(c) processing means, connected to said output of said storage means, for processing said image data in accordance with said functionally related image reproduction signal processing data, wherein said functionally related image reproduction signal processing data comprises color temperature compensation data.

22. A storage and retrieval format adapted for use with an electronic camera having picture elements, which electronic camera produces image data based on a photographed image and related non-image data, which comprises:
(a) a magnetic recording medium;
(b) a first zone on said magnetic recording medium for storing related non-image data comprising at least one address of at least one defective picture element; and
(c) at least one frame, disposed on said magnetic recording medium adjacent said first zone, for storing:
(i) synchronizing signals in a synchronizing signals portion;
(ii) image data in an image data portion; and
(iii) non-image data, related to said image data in said image data portion, in a non-image data portion.

* * * * *